United States Patent
Sasaki et al.

(10) Patent No.: US 8,640,438 B2
(45) Date of Patent: Feb. 4, 2014

(54) HIGH HUMIDITY GAS TURBINE EQUIPMENT

(75) Inventors: Kenji Sasaki, Hitachi (JP); Yoshiki Noguchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1604 days.

(21) Appl. No.: 11/753,199

(22) Filed: May 24, 2007

(65) Prior Publication Data
US 2007/0271900 A1    Nov. 29, 2007

(30) Foreign Application Priority Data

May 26, 2006   (JP) .................................. 2006-146279

(51) Int. Cl.
F02C 3/30    (2006.01)
F02C 6/18    (2006.01)
F02C 7/10    (2006.01)

(52) U.S. Cl.
USPC ...................................... 60/39.55; 60/39.511

(58) Field of Classification Search
USPC .............. 60/39.55, 785, 39.182, 39.5, 39.511
See application file for complete search history.

(56) References Cited

U.S. PATENT DOCUMENTS

| | | | | |
|---|---|---|---|---|
| 4,522,024 A * | 6/1985 | Zaugg | ............................... | 60/775 |
| 4,936,088 A * | 6/1990 | Bell | ............................... | 60/777 |
| 5,027,601 A * | 7/1991 | Yoshida et al. | ............... | 60/641.5 |
| 5,290,327 A * | 3/1994 | Rossle | ......................... | 60/39.12 |
| 6,167,706 B1 * | 1/2001 | Bronicki et al. | ................ | 60/651 |
| 6,389,799 B1 | 5/2002 | Hatamiya et al. | | |
| 6,648,931 B1 * | 11/2003 | Rao | ............................... | 60/39.12 |
| 2003/0005697 A1 * | 1/2003 | Alexander | ..................... | 60/641.2 |
| 2004/0035117 A1 * | 2/2004 | Rosen | ......................... | 60/39.511 |
| 2005/0121532 A1 * | 6/2005 | Reale et al. | ................... | 237/12.1 |
| 2007/0017205 A1 | 1/2007 | Sasaki et al. | | |

FOREIGN PATENT DOCUMENTS

| | | |
|---|---|---|
| JP | 05-340501 | 12/1993 |
| JP | 11-257096 | 9/1999 |
| JP | 2000-345857 | 12/2000 |
| JP | 2002-106361 | 4/2002 |
| JP | 2003-003805 | 1/2003 |
| JP | 2003-041945 | 2/2003 |
| JP | 2005-098156 | 4/2005 |
| WO | WO 98/48159 | 10/1998 |

OTHER PUBLICATIONS http://www.rpi.edu/dept/chem-eng/Biotech-Environ/FERMENT/ "Heat Exchanger in Bio-Chemical Process", Wai Wan, accessed on Sep. 12, 2013.*
Translation of Decision on Petition in Japanese Patent Application No. 2006-146279 mailed Mar. 10, 2009.
Japanese Office Action in Japanese Patent Application No. 2009-114518 issued Apr. 19, 2011.

* cited by examiner

*Primary Examiner* — Ted Kim
(74) *Attorney, Agent, or Firm* — Brundidge & Stanger, P.C.

(57) ABSTRACT

The present invention provides high humidity gas turbine equipment including a compressor compressing air, a combustor combusting the compressed air and a fuel, a gas turbine driven by the combustion gas, a generator driven by the gas turbine to generate power, a humidifier humidifying the compressed air by directly contacting it with hot water, and a regenerative heat exchanger heating the humidified compressed air by exhaust gas of the gas turbine and feeding it to the combustor, heat exchangers generating hot water for the humidifier utilizing a factory exhaust heat medium from the outside, a boiler generating steam to be supplied to the outside utilizing the exhaust gas of the gas turbine, and a boiler generating steam to be supplied to the outside utilizing the compressed air discharged from the compressor.

12 Claims, 2 Drawing Sheets

HIGH HUMIDITY GAS TURBINE EQUIPMENT

BACKGROUND OF THE INVENTION

1. Field of the Invention

The present invention relates to high humidity gas turbine equipment which humidifies compressed air to be supplied to a combustor, and improves the turbine output and efficiency.

2. Description of Related Art

High humidity gas turbine equipment includes, for example, a compressor for compressing air, a combustor for mixing compressed air generated by the compressor with a fuel to combust those, a gas turbine driven by combustion gas generated by the combustor, a generator for generating electric power by drive of the gas turbine, a feed water heater for heating water by exhaust gas of the gas turbine, a humidifier for humidifying the compressed air fed from the compressor by means of hot water generated by the feed water heater, and a regenerative heat exchanger for heating the compressed air fed from the humidifier by the exhaust gas of the gas turbine and feeding the compressed air to the combustor (for example, see JP-A-2005-98156). In this high humidity gas turbine equipment, by humidifying the compressed air to be supplied to the combustor, the flow rate of the combustion gas increases and the specific heat of the combustion gas increases, whereby the turbine output becomes increased. Further, the power generation efficiency becomes enhanced by recovering heat amount required for power generation for generating the hot water for the humidifier, heating the compressed air, and the like, from the exhaust gas of the gas turbine. Further, in this high humidity gas turbine equipment, there is provided an exhaust heat boiler which heats the water by the exhaust gas of the gas turbine, and generates steam to be supplied to the outside. By this boiler, the cogeneration effect can be obtained.

BRIEF SUMMARY OF THE INVENTION

However, the following problem exists in the above described prior art.

That is, in the above described prior art, the power generation efficiency is enhanced by utilizing a part of the heat amount recovered from the exhaust gas of the gas turbine for generating the hot water for the humidifier for example, and the cogeneration effect is obtained by utilizing a part of the heat amount recovered from the exhaust gas of the gas turbine for generating the steam to be supplied to the outside. Therefore, for example, if the heat amount utilized for generating the steam to be supplied to the outside is increased with the intention of enhancement of the cogeneration efficiency, for example, the heat amount or the like to be utilized for generating the hot water for the humidifier becomes insufficient, and therefore there is the possibility that the power generation efficiency is reduced.

An object of the present invention is to provide high humidity gas turbine equipment capable of enhancing cogeneration efficiency while suppressing reduction in power generating efficiency.

(1) In order to attain the above described object, in high humidity gas turbine equipment including a compressor for compressing air, a combustor for combusting the compressed air generated by the compressor with a fuel, a gas turbine driven by combustion gas generated by the combustor, a generator for generating power by drive of the gas turbine, a humidifier for bringing the compressed air from the compressor into direct contact with hot water to humidify the compressed air, and a regenerative heat exchanger for heating the compressed air from the humidifier by exhaust gas of the gas turbine and feeding the compressed air to the combustor, the present invention includes a first heating device for generating hot water for the humidifier by heating it utilizing a factory exhaust heat medium from the outside and, and a second heating device for generating steam or hot water to be supplied to the outside by heating it utilizing the exhaust gas of the gas turbine.

In the present invention, there is provided the first heating device which performs heating by utilizing a factory waste heat medium (mainly a low temperature waste heat medium at about 200° C. or lower) generated in an industrial plant for example, and generates the hot water (for example, the hot water at about 150° C.) for the humidifier. Thereby, factory waste heat can be effectively used. Further, by supplementing the heat amount required for generating the hot water for the humidifier by the factory waste heat, reduction in power generating efficiency can be suppressed without using the exhaust gas of the gas turbine or the like, for example (exhaust gas at about 250° C. or higher, for example). In the present invention, the second heating device which performs heating by utilizing the exhaust gas of the gas turbine and supplies generated steam (or hot water) to a factory or the like is provided. Thereby, the heat amount recovered from the exhaust gas of the gas turbine can be used for generating the steam (or the hot water) to be supplied to the outside without distributing the heat amount for generating the hot water for the humidifier, and the cogeneration efficiency can be enhanced. Accordingly, in the present invention, cogeneration efficiency can be enhanced while reduction in power generating efficiency is suppressed.

(2) In order to attain the above described object, in high humidity gas turbine equipment including a compressor for compressing air, a combustor for combusting the compressed air generated by the compressor with a fuel, a gas turbine driven by combustion gas from the combustor, a generator for generating power by drive of the gas turbine, a humidifier for bringing the compressed air from the compressor into direct contact with hot water to humidify the compressed air, and a regenerative heat exchanger for heating the compressed air from the humidifier by exhaust gas of the gas turbine and feeding the compressed air to the combustor, the present invention includes a first heating device for generating hot water for the humidifier by heating it utilizing a factory exhaust heat medium from the outside, and a third heating device for generating steam or hot water to be supplied to the outside by heating it utilizing the compressed air discharged from the compressor.

In the present invention, as in the above described (1), there is provided the first heating device which heats water by utilizing a factory waste heat medium (mainly a low temperature waste heat medium at about 200° C. or lower) generated in an industrial plant for example, and generates the hot water (for example, hot water at about 150° C.) for the humidifier. Thereby, factory waste heat can be effectively used. Further, by supplementing the heat amount required for generating the hot water for the humidifier by the factory waste heat from the outside, reduction in power generating efficiency can be suppressed without using, for example, the compressed air discharged from the compressor (compressed air at about 250° C. or higher, for example) or the like. In the present invention, the third heating device which heats water by utilizing the compressed air discharged from the compressor and supplies generated steam (or hot water) to a factory or the like is provided. Thereby, the heat amount recovered from the compressed air discharged from the compressor can be used for generating the steam (or the hot water) to be supplied to the outside without being distributed for generating the hot water for the humidifier, and the cogeneration efficiency can be enhanced. Accordingly, in the present invention, cogeneration efficiency can be enhanced while reduction in power generating efficiency is suppressed.

(3) In order to attain the above described object, in high humidity gas turbine equipment comprising a compressor for compressing air, a combustor for combusting the compressed air generated by the compressor together with a fuel, a gas turbine driven by combustion gas from the combustor, a generator for generating power by drive of the gas turbine, a humidifier for bringing the compressed air from the compressor into direct contact with hot water to humidify the compressed air, and a regenerative heat exchanger for heating the compressed air from the humidifier by exhaust gas of the gas turbine and feeding the compressed air to the combustor, the present invention includes a first heating device for heating water by utilizing a factory exhaust heat medium from the outside and generating hot water for the humidifier, a second heating device for heating water by utilizing the exhaust gas of the gas turbine and generating steam or hot water to be supplied to the outside, and a third heating device for heating water by utilizing the compressed air discharged from the compressor and generating steam or hot water to be supplied to the outside.

(4) In any one of the above described (1) to (3), the first heating device preferably has a heat pump or an auxiliary burner.

Thereby, it is possible to cope with the case where the hot water for the humidifier cannot be sufficiently generated only by the heat amount recovered from the factory exhaust heat medium for example, and to generate the hot water for the humidifier.

(5) In any one of the above described (1) to (3), the second heating device or/and the third heating device preferably has a heat pump or an auxiliary burner.

Thereby, it is possible to cope with the case where steam or hot water to be supplied to the outside cannot be sufficiently generated only by the heat amount recovered from the compressed air from the compressor and the exhaust gas of the gas turbine for example, and to generate the steam or hot water to be supplied to the outside.

(6) In any one of the above described (1) to (3), preferably, there are provided a first pipe system used when the second heating device or/and the third heating device generates steam or hot water to be supplied to the outside, and a second pipe system used when the second heating device or/and the third heating device generates hot water for the humidifier, and there is provided a valve means capable of switching so that any one of the first pipe system and the second pipe system is in a communicating state, and the other one is in a shutoff state.

Thereby, when switching by the valve means so that the first pipe system is in the communicating state and the second pipe system is in the shutoff state, for example, the second heating device or/and the third heating device can generate steam (or hot water) to be supplied to the outside. On the other hand, when switching by the valve means so that the first pipe system is in the shutoff state and the second pipe system is in the communicating state, for example, the second heating device or/and the third heating device can generate the hot water for the humidifier. Thereby, even when the factory exhaust heat medium cannot be used due to the operating state of a factory for example, the hot water for the humidifier required for power generation can be reliably generated.

According to the present invention, the cogeneration efficiency can be enhanced while reduction in power generating efficiency is suppressed.

Other objects, features and advantages of the invention will become apparent from the following description of the embodiments of the invention taken in conjunction with the accompanying drawings.

DETAILED DESCRIPTION OF THE INVENTION

One embodiment of the present invention will now be described with reference to the drawings.

Figure 1:
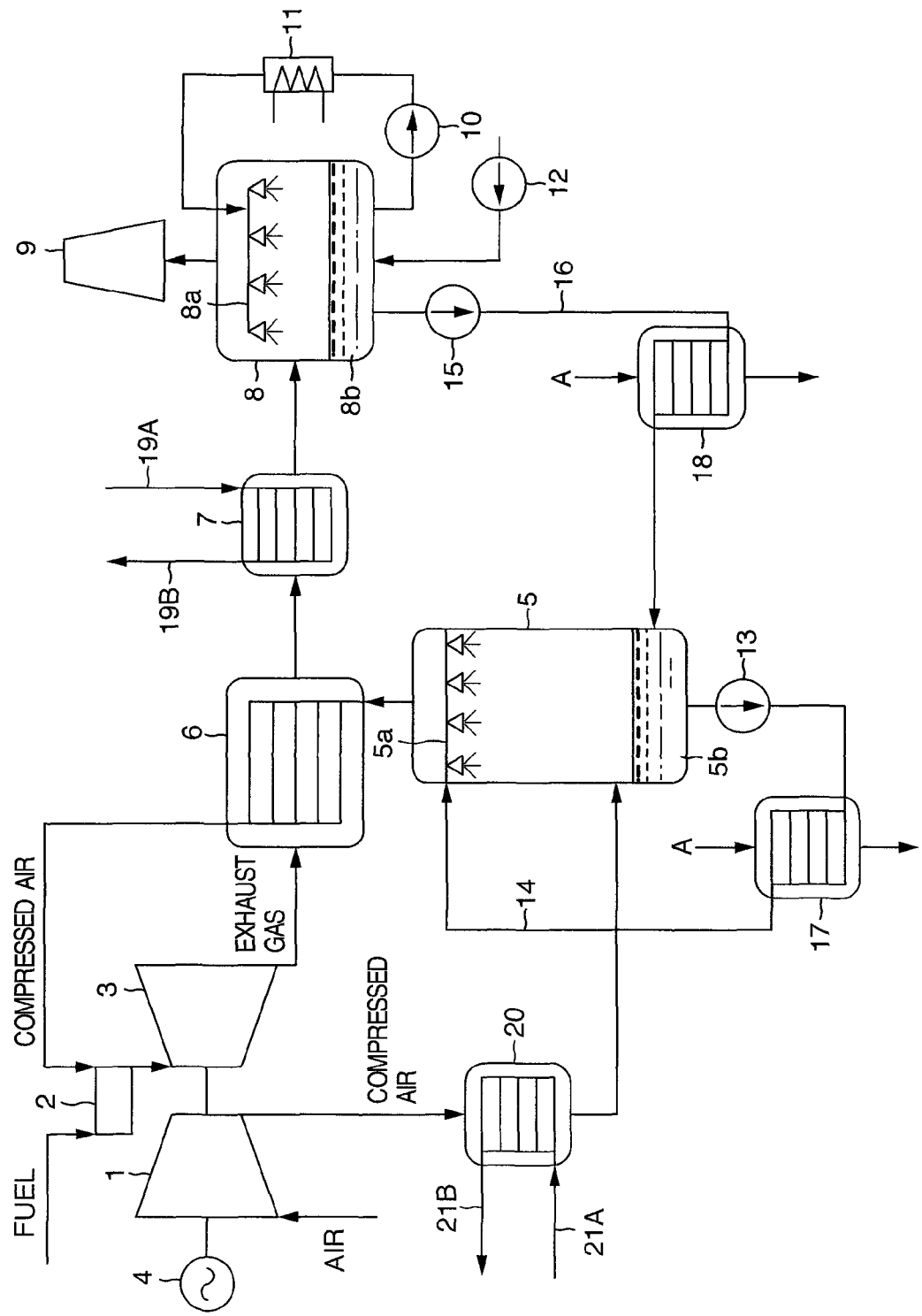
FIG. 1 is a schematic view showing the configuration of one embodiment of high humidity gas turbine equipment of the present invention.

FIG. 1 is a schematic view showing the configuration of one embodiment of high humidity gas turbine equipment of the present invention.

In FIG. 1, the high humidity gas turbine equipment includes a compressor 1 which compresses air, a combustor 2 which mixes and combusts the compressed air generated in the compressor 1 and a fuel, a gas turbine 3 which is driven by combustion gas generated in the combustor 2, a generator 4 which generates electric power by drive of the gas turbine 3, a humidifier 5 which brings the compressed air from the compressor 1 in direct contact with hot water and humidifies the compressed air, and a regenerative heat exchanger 6 which heats the compressed air from the humidifier 5 by exhaust gas of the gas turbine 3 and feeds it to the combustor 2. The compressor 1, the gas turbine 3 and the generator 4 are coaxially connected, so that the compressor 1 and the generator 4 are rotationally driven by the rotational drive of the gas turbine 3.

A boiler 7 which recovers heat from the exhaust gas of the gas turbine 3, a water recovering device 8 which recovers humidity from the exhaust gas, and a smoke stack 9 which releases the exhaust gas into the air are provided in this sequence on the downstream side of the exhaust gas from the regenerative heat exchanger 6. In the water recovering device 8, the water is sprayed into the exhaust gas from a water spraying part 8a, whereby humidity included in the exhaust gas condenses, and the condensed water drops to be recovered in a water storing part 8b. The water stored in the water storing part 8b of the water recovering device 8 is fed to a cooling device 11 by a circulating pump 10 to be cooled, and thereafter sprayed from the water spraying part 8a. The water of the water storing part 8b of the water recovering device 8 is supplied by a supply pump 12.

The humidifier 5 humidifies the compressed air by spraying hot water (hot water at about 150° C., for example) into the compressed air from a liquid spraying part 5a to cause a part of the sprayed hot water to be in contact with the compressed air to evaporate, and the hot water which has not evaporated drops to be recovered into a water storing part 5b. The water stored in the water storing part 5b of the humidifier 5 is fed to the liquid spraying part 5a by a circulating pump 13 through a circulation pipe system 14 and sprayed from the liquid spraying part 5a. The water of the water storing part 5b of the humidifier 5 is supplied from the water storing part 8b of the water recovering device 8 by a supply pump 15 via a supply pipe system 16.

As a big characteristic of this embodiment, the circulation pipe system 14 and the supply pipe system 16 are provided with the heat exchanger 17 and 18 (first heat exchangers) respectively, and the heat exchangers 17 and 18 heat water by using a factory exhaust heat medium A (mainly an exhaust heat medium at about 200° C. or lower) generated in, for example, an industrial plant. In detail, the heat exchanger 17 heats water from the water storing part 5b of the humidifier 5 by heat exchange with the factory exhaust heat medium A, and the heat exchanger 18 heats water from the water storing part 8b of the water recovery device 8 by heat exchange with the factory exhaust heat medium A.

The boiler 7 heats water used in, for example, a factory and introduced via a pipe 19A by heat exchange with exhaust gas (exhaust gas at about 250° C. or higher, for example) of the gas turbine 3, and supplies generated steam (which is steam at about 250° C. or higher, for example, or may be hot water) to the factory through a pipe 19B.

A boiler 20 (third heating device) which recovers heat from the compressed air discharged from the compressor 1 is provided between the compressor 1 and the humidifier 5. The boiler 20 heats water, which is used in, for example, a factory and introduced through a pipe 21A, by heat exchange with the compressed air (for example, compressed air at about 250° C. or higher) compressed and increased in temperature in the compressor 1, and supplies generated steam (which is, for example, steam at about 250° C. or higher, or may be hot water) to a factory through a pipe 21B.

In the embodiment configured as above, the heat exchangers 17 and 18 heat water by using the factory exhaust heat medium A and generates hot water for the humidifier 5. Thereby, factory waste heat can be effectively used. That is, although various kinds of waste heat media A is generated in a factory, many of these factory waste heat media A are not effectively used due to low temperature, and therefore discarded. When discarding the factory waste heat media A, those have to be cooled to about 60° C. for the legal reason, and cooling equipment for this is required to be installed. Since such factory waste heat media A are used in this embodiment, energy efficiency of the entire factory can be enhanced. Further, the cooling equipment for discarding the factory waste heat media A can be reduced or scaled down.

By supplementing the heat amount required for generating hot water for the humidifier 5 by factory waste heat, reduction in power generating efficiency can be suppressed without using the exhaust gas of the gas turbine 3 or the compressed air and the like discharged from the compressor 1, for example. In this embodiment, the boiler 7 heats water utilizing the exhaust gas of the gas turbine 3, and supplies generated steam to a factory or the like. The boiler 20 utilizes the compressed air discharged from the compressor 1 to heat water, and supplies the generated steam to a factory or the like. Thereby, the heat amount recovered from the exhaust gas of the gas turbine and the compressed air discharged from the compressor 1 can be used for generating steam to be supplied to the outside, without being distributed for generating hot water for the humidifier 5, and cogeneration efficiency can be enhanced. Accordingly, in this embodiment, the cogeneration efficiency can be enhanced while reduction in power generation efficiency is suppressed.

In this embodiment, the boiler 7 which heats water by using the exhaust gas of the gas turbine 3 and generates steam to be supplied to the outside, and the boiler 20 which heats water by using the compressed air discharged from the compressor 1 and generates steam to be supplied to the outside are provided, and thereby, cogeneration efficiency can be enhanced as compared with the case where any one of those is provided.

In the above described one embodiment, the case where the heat exchanger 17 which heats water from the water storing part 5b of the humidifier 5 by using the factory exhaust heat medium A, and the heat exchanger 18 which heats water from the water storing part 8b of the water recovering device 8 by using the factory exhaust heat medium A are provided is described as an example, but the present invention is not limited to this, and for example, only any one of the heat exchangers 17 and 18 may be provided. For example, in order to cope with the case where hot water for the humidifier 5 cannot be sufficiently generated only by the heat amount recovered from the factory exhaust heat medium A, the present invention may be provided with a heat pump, an auxiliary burner and the like in combination. In such a case, the same effect as described above can be also obtained.

In the above described one embodiment, the case where the boiler 7 which heats water by using the exhaust gas of the gas turbine 3 and generates steam (or hot water) to be supplied to the outside, and the boiler 20 which heats water by using the compressed air discharged from the compressor 1 and generates steam (or hot water) to be supplied to the outside are provided is described as an example, but the present invention is not limited to this. That is, only any one of the boilers 7 and 20 may be provided for example, and only any one of the boilers 7 and 20 may be used for generating hot water for the humidifier 5 for example. In order to cope with the case where steam (or hot water) to be supplied to the outside cannot be sufficiently generated only by the heat amount recovered from the exhaust gas of the gas turbine 3 and the compressed air discharged from the compressor 1, for example, the present invention may be provided with a heat pump, an auxiliary burner and the like in combination. In such a case, the same effect as described above can be also obtained.

Another embodiment of the present invention will be described based on FIG. 2. This embodiment is the embodiment which can switch the case where the boilers 7 and 20 generate steam to be supplied to the outside and the case where the boilers 7 and 20 generate hot water for the humidifier.

Figure 2:
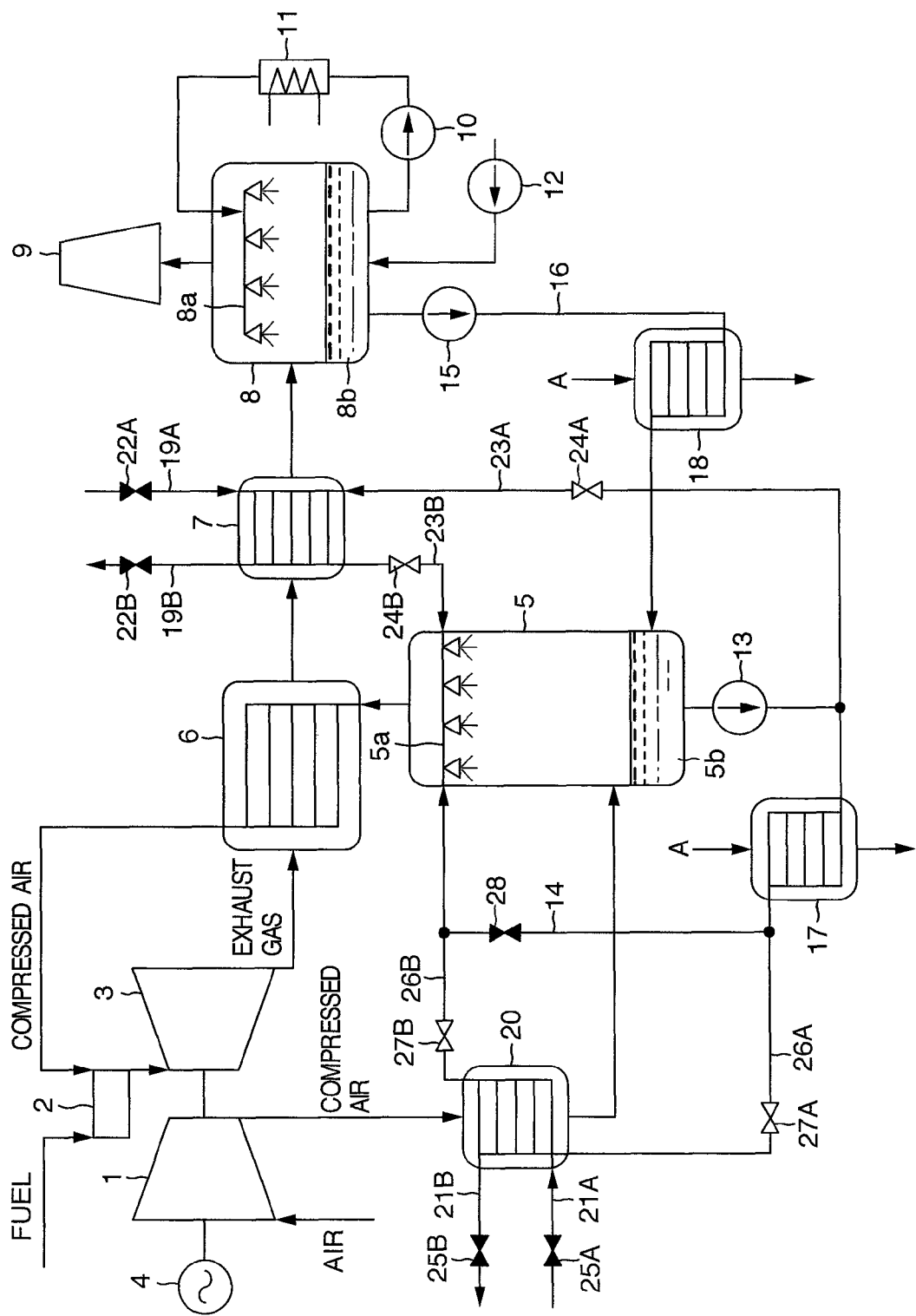
FIG. 2 is a schematic view showing the configuration of another embodiment of the high humidity gas turbine equipment of the present invention.

FIG. 2 is a schematic view showing the configuration of high humidity gas turbine equipment according to this embodiment. In FIG. 2, the same parts as those in the above described one embodiment are assigned with the same reference numerals and characters, and the explanation of those will be properly omitted.

In this embodiment, the above described pipes 19A and 19B as a first pipe system are connected to the boiler 7, and these pipes 19A and 19B are provided with switching valves 22A and 22B which can switch the pipes 19A and 19B between a communicating state and a shutoff state. As a second pipe system which bypasses the circulation pipe system 14, a pipe 23A which is connected and branches from on the downstream side of the circulating pump 13 in the circulation pipe system 14, and a pipe 23B which is connected and jointed on the downstream side of the heat exchanger 17 in the circulation pipe system 14 are connected to the boiler 7, and these pipes 23A and 23B are provided with switching valves 24A and 24B which can switch the pipes 23A and 23B between a communicating state and a shutoff state, respectively.

The above described pipes 21A and 21B as the first pipe system are connected to the boiler 20, and these pipes 21A and 21B are provided with switching valves 25A and 25B which can switch the pipes 21A and 21B between a communicating state and a shutoff state. As the second pipe system which bypasses the circulation pipe system 14, a pipe 26A which is connected and branches off on the downstream side of the circulating pump 13 in the circulation pipe system 14 (the downstream side of the heat exchanger 17 in FIG. 2), and a pipe 26B which is connected and jointed on the downstream side of the heat exchanger 17 in the circulation pipe system 14 (the downstream side of the branch portion of the pipe 26A in the circulation pipe system 14 in FIG. 2) are connected to the boiler 20, and these pipes 26A and 26B are provided with switching valves 27A and 27B which can switch the pipes 26A and 26B between a communicating state and a shutoff state, respectively.

In the circulation pipe system, a switching valve 28 which can switch the circulation pipe system between a communicating state and a shutoff state is provided on the downstream side of the branch portions of the pipes 23A and 26A and on the upstream side of the joint portions of the pipes 23B and 26B (in other words, in a bypass portion).

When the switching valves 22A, 22B, 25A, 25B and 28 are switched into the communicating state, and the switching valves 24A, 24B, 27A and 27B are switched into the shutoff state for example, the boiler 7 generates steam to be supplied to the outside by using the exhaust gas of the turbine 3, the boiler 20 generates steam to be supplied to the outside by using the compressed air discharged from the compressor 1, and the heat exchanger 17 can heat water from the water storing part 5b of the humidifier 5 by using the factory waste heat medium A from the outside, as in the above described first embodiment. Thereby, as in the above described first embodiment, cogeneration efficiency can be enhanced while reduction in power generation efficiency is suppressed.

On the other hand, when the switching valves 22A, 22B, 25A, 25B and 28 are switched into the shutoff state (shown by being painted in black in the drawing) and the switching valves 24A, 24B, 27A and 27B are switched into the communicating state (shown by white in the drawing) as shown in FIG. 2 for example, the boiler 7 heats water from the water storing part 5b of the humidifier 5 by using the exhaust gas of the turbine 3, and the boiler 20 can heat water from the water storing part 5b of the humidifier 5 by using the compressed air discharged from the compressor 1. Thereby, even when the factory exhaust heat medium A cannot be used due to operating state of a factory for example, hot water for the humidifier 5 which is required for power generation can be reliably generated.

In the above described other embodiment, the case where the second pipe system which bypasses the circulation pipe system 14 is connected to the boilers 7 and 20 is described as an example, but the present invention is not limited to this. Namely, instead of this, the second pipe system which bypasses the supply pipe system 16 may be connected to any one of the boilers 7 and 20, for example. In such a case, the above described same effect can be also obtained.

In the above explanation, as the high humidity gas turbine equipment, the configuration including the water recovery device 8 is described as an example, but the high humidity gas turbine equipment is not limited to this, and the high humidity gas turbine equipment may be configured so as to release the exhaust gas from the smoke stack 9 without recovering humidity from the exhaust gas of the gas turbine 3 without providing, for example, the water recovery device 8. For example, an inlet air humidifying device may be provided on the inlet side of the compressor 1. In such a case, the same effect as the above description can be also obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. High humidity gas turbine equipment comprising:
a compressor for compressing air;
a combustor for combusting compressed air generated by the compressor and a fuel;
a gas turbine driven by combustion gas generated by the combustor;
a generator for generating power by being driven by the gas turbine;
a humidifier for humidifying the compressed air by bringing the compressed air from the compressor into direct contact with hot water;
a regenerative heat exchanger for heating the compressed air from the humidifier by exhaust gas of the gas turbine, and feeding the heated compressed air to the combustor;
a first heating device for heating water recovered from the exhaust gas of the gas turbine by utilizing a factory exhaust heat medium from the outside to generate hot water for the humidifier;
a second heating device for heating water by utilizing the exhaust gas of the gas turbine to generate steam or hot water to be supplied to the outside;
a water recovering device for recovering water from the exhaust gas of the second heating device;
a supply pipe system for supplying water recovered by the water recovering device to the humidifier;
a circulation pipe system for reusing the water used in the humidifier, again in the humidifier;
wherein the first heating device comprises heat exchangers that receive the factory exhaust heat medium provided in both of the supply pipe system and the circulation pipe system; and
wherein the temperature of the factory exhaust heat medium introduced in the first heating device is lower than that of the exhaust gas introduced in the second heating device.

2. The high humidity gas turbine equipment according to claim 1, wherein the first heating device comprises a heat pump or an auxiliary burner.

3. The high humidity gas turbine equipment according to claim 1, wherein the second heating device comprises a heat pump or an auxiliary burner.

4. The high humidity gas turbine equipment according to claim 1, further comprising:
a first pipe system used when the second heating device generates the steam or the hot water to be supplied to the outside;
a second pipe system used when the second heating device generates the hot water for the humidifier; and
a valve means capable of switching so that any one of the first pipe system and the second pipe system is in a communicating state, and the other one is in a shutoff state.

5. High humidity gas turbine equipment comprising:
a compressor for compressing air;
a combustor for combusting compressed air generated by the compressor and a fuel;
a gas turbine driven by combustion gas from the combustor;
a generator for generating power by being driven by the gas turbine;

a humidifier for humidifying the compressed air by bringing the compressed air from the compressor into direct contact with hot water;

a regenerative heat exchanger for heating the compressed air from the humidifier by exhaust gas of the gas turbine, and feeding the heated compressed air to the combustor;

a first heating device for heating water recovered from the exhaust gas of the gas turbine by utilizing a factory exhaust heat medium from the outside to generate hot water for the humidifier;

a third heating device for heating water by utilizing the compressed air discharged from the compressor to generate steam or hot water to be supplied to the outside;

a water recovering device for recovering water from the exhaust gas out of the regenerative heat exchanger;

a supply pipe system for supplying water recovered by the water recovering device to the humidifier;

a circulation pipe system for reusing the water used in the humidifier, again in the humidifier;

wherein the first heating device comprises heat exchangers that receive the factory exhaust heat medium provided in both of the supply pipe system and the circulation pipe system; and wherein the temperature of the factory exhaust heat medium introduced in the first heating device is lower than that of the exhaust gas introduced in the third heating device.

6. The high humidity gas turbine equipment according to claim 5, wherein the first heating device comprises a heat pump or an auxiliary burner.

7. The high humidity gas turbine equipment according to claim 5, wherein the third heating device comprises a heat pump or an auxiliary burner.

8. The high humidity gas turbine equipment according to claim 5, further comprising:

a first pipe system used when the third heating device generates the steam or the hot water to be supplied to the outside;

a second pipe system used when the third heating device generates the hot water for the humidifier; and a valve means capable of switching so that any one of the first pipe system and the second pipe system is in a communicating state, and the other one is in a shutoff state.

9. High humidity gas turbine equipment comprising:

a compressor for compressing air;

a combustor for combusting compressed air generated by the compressor and a fuel;

a gas turbine driven by combustion gas from the combustor;

a generator for generating power by being driven by the gas turbine;

a humidifier for humidifying the compressed air by bringing the compressed air from the compressor into direct contact with hot water;

a regenerative heat exchanger for heating the compressed air from the humidifier by exhaust gas of the gas turbine, and feeding the heated compressed air to the combustor;

a first heating device for heating water recovered from the exhaust gas of the gas turbine by utilizing a factory exhaust heat medium from the outside to generate hot water for the humidifier;

a second heating device for heating water by utilizing the exhaust gas of the gas turbine to generate steam or hot water to be supplied to the outside;

a third heating device for heating water by utilizing the compressed air discharged from the compressor to generate steam or hot water to be supplied to the outside;

a water recovering device for recovering water from the exhaust gas out of the second heating device;

a supply pipe system for supplying the water recovered by the water recovering device to the humidifier;

a circulation pipe system for reusing the water used in the humidifier, again in the humidifier;

wherein the first heating device comprises heat exchangers that receive the factory exhaust heat medium provided in both of the supply pipe system and the circulation pipe system; and wherein the temperature of the factory exhaust heat medium introduced in the first heating device is lower than that of the exhaust gas introduced in the second heating device and that of the compressed air introduced in the third heating device.

10. The high humidity gas turbine equipment according to claim 9, wherein the first heating device comprises a heat pump or an auxiliary burner.

11. The high humidity gas turbine equipment according to claim 9, wherein at least one of the second heating device and the third heating device comprises a heat pump or an auxiliary burner.

12. The high humidity gas turbine equipment according to claim 9, further comprising:

a first pipe system used when one of the second heating device and the third heating device generates the steam or the hot water to be supplied to the outside;

a second pipe system used when one of the second heating device and the third heating device generates the hot water for the humidifier; and a valve means capable of switching so that any one of the first pipe system and the second pipe system is in a communicating state, and the other one is in a shutoff state.

* * * * *